(12) United States Patent
Audenaert et al.

(10) Patent No.: US 10,223,270 B1
(45) Date of Patent: Mar. 5, 2019

(54) PREDICTING FUTURE ACCESS REQUESTS BY INVERTING HISTORIC ACCESS REQUESTS IN AN OBJECT STORAGE SYSTEM

(71) Applicant: Western Digital Technologies, Inc., San Jose, CA (US)

(72) Inventors: Pieter Audenaert, Zele (BE); Arne Vansteenkiste, Gentbrugge (BE); Wim Michel Marcel De Wispelaere, Ghent (BE)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/697,265

(22) Filed: Sep. 6, 2017

(51) Int. Cl.
| | |
|---|---|
| *G06F 12/00* | (2006.01) |
| *G06F 12/0862* | (2016.01) |
| *G06F 17/30* | (2006.01) |
| *G06F 12/0866* | (2016.01) |

(52) U.S. Cl.
CPC .......... *G06F 12/0862* (2013.01); *G06F 12/00* (2013.01); *G06F 17/30722* (2013.01); *G06F 12/0866* (2013.01); *G06F 2212/602* (2013.01); *G06F 2212/6024* (2013.01)

(58) Field of Classification Search
None
See application file for complete search history.

(56) References Cited

U.S. PATENT DOCUMENTS 9,384,289 B2 * 7/2016 Murdock ............ G06F 17/3087

* cited by examiner

*Primary Examiner* — Midys Rojas
(74) *Attorney, Agent, or Firm* — Patient Law Works LLP

(57) ABSTRACT

Requests to access specific ones of a plurality of stored objects are processed by multiple access nodes. A separate access history is maintained for each access node. Each access history identifies stored objects most recently accessed through the specific node. A separate predicted access future is maintained for each stored object. A predicted access future associated with a specific stored object can be in the form of a listing of stored objects statistically predicted to be those most likely to be accessed within a given temporal proximity after the specific stored object is accessed. Each predicted access future is determined based on inversion of maintained access histories. Responsive to receiving an access request for a specific stored object, the predicted future associated with the requested object is read, a specific number of additional stored objects identified in the associated predicted future is pre-fetched from slower to faster storage.

20 Claims, 4 Drawing Sheets

PREDICTING FUTURE ACCESS REQUESTS BY INVERTING HISTORIC ACCESS REQUESTS IN AN OBJECT STORAGE SYSTEM

TECHNICAL FIELD

The present disclosure pertains generally to storage and retrieval of digital data, and more specifically to predicting future access requests by inverting historic access requests in an object storage system.

BACKGROUND

The rise in electronic and digital device technology has rapidly changed the way society communicates, interacts, and consumes goods and services. Modern computing devices, such as desktop computers, rack mounted computers, laptops, smart phones, tablets and wearable computing devices allow organizations and users to have access to a variety of useful applications in many locations. Using such applications results in the generation of a large amount of data. Storing and retrieving the produced data is a significant challenge associated with providing useful applications and devices.

The data generated by online services and other applications can be stored at data storage facilities. As the amount of data grows, having a plurality of users sending and requesting data can result in complications that reduce efficiency and speed. Quick access time in storage systems is essential for good performance. In response, efficient methods to store and retrieve data can improve the overall functioning of a data storage system significantly.

SUMMARY

Future access requests are predicted in an object storage context, by tracking and inverting historic object access activity. When a given stored object is accessed, those objects that are most likely to be requested shortly thereafter are identified with a high probability, based on inversion of access histories. The identified objects can then be proactively pre-fetched from high-latency storage (e.g., mechanical hard disk) to low latency storage (e.g., flash memory). This reduces access time significantly when the actual request for a pre-fetched object occurs. This functionality can be performed with minimal overall impact on computing resources, using a low-priority process that learns and accumulates this statistical prediction information using spare CPU cycles. These techniques for inverting access history to future predicted access are independent of the number of access nodes (e.g., load balancers and the like) utilized to process access requests.

Requests to access specific ones of a plurality of stored objects are processed (served) by multiple access nodes. A separate access history is maintained in real-time for each separate access node. Each access history identifies those stored objects most recently accessed through the specific access node (the specific size to use for the access history is a variable design parameter). In addition, a separate predicted access future can be maintained in real-time for each separate specific stored object. A predicted access future associated with a specific stored object can be in the form of a listing of stored objects statistically predicted to be those most likely to be accessed within a given temporal proximity (e.g., within a given time frame or number of access requests) after the specific stored object is accessed. Each predicted access future is determined based on inversion of maintained access histories. Responsive to receiving an access request for a specific stored object, the received access request for the specific requested stored object is processed, the predicted access future associated with the requested object is read, and one or more additional stored object(s) identified in the associated predicted access future may be pre-fetched from slower storage (e.g., electro-mechanical storage such as a hard disk) to faster storage (e.g., solid state storage such as flash). The specific pre-determined number of additional stored objects to pre-fetch is a variable design parameter (e.g., 0, 1, 2, 3, . . . ).

In one embodiment, each access node maintains a separate locally-stored access history, identifying a given number of stored objects most recently accessed through the specific access node. An access history can be in the form of, for example, a circular buffer of a given size, holding the given number of object IDs of those stored objects most recently accessed through the given access node. In this embodiment, every time a given object is accessed through a given access node, the local access history of that access node is stored in association with the object as metadata. For example, when a new object is initially stored by a given access node, the given access node's current locally-stored access history is stored as metadata in association with the new stored object. Where an existing stored object is accessed by a given access node, the object's existing access history can be replaced by or merged with that of the current access node. Note that merging access histories can take the form of merging local access histories of multiple access nodes.

In this embodiment, in order to maintain predicted access futures associated with separate specific stored objects, the access histories stored in association with separate specific stored objects can be periodically read, for example by a low priority process. In this embodiment, a separate predicted access future can be stored in association with each specific object as metadata. For each separate specific stored object identified in an access history associated with a given stored object, the given stored object is added to the predicted access future associated with the specific identified object. As with the access histories, a predicted access future can be in the form of, e.g., a circular buffer holding identifiers of stored objects. More generally, a predicted future can be instantiated as a data structure holding identifiers of a given number of stored objects statistically predicted to be those most likely to be accessed within a given temporal proximity after the associated stored object is accessed.

In another embodiment, separate access histories corresponding to each specific access node of the plurality are maintained centrally, for example on a server. In this embodiment, each separate access history can be in the form of, e.g., a first-in first-out (FIFO) queue containing identifiers of a given number of stored objects most recently accessed through the corresponding specific access node. Whenever a given access node processes an access request for a specific stored object, the access history corresponding to the given access node can be updated by adding the identifier of the requested object to the back of the corresponding FIFO queue, and discarding the identifier at the front. Thus, the updated queue contains the N objects that were accessed via the given node after the access of the object that was discarded from the queue, where N is the queue size. So, responsive to discarding the identifier at the front of the queue, the stored objects identified in the queue are added to the predicted access future associated with the discarded object. This can take the form of merging an existing predicted access future associated with the discarded object with the current queue, which can involve merging predicted access futures resulting from inverting access histories of multiple access nodes. Merging can take the form of, for example, accumulating total instances of specific stored objects in both the existing predicted access future associated with the displaced object, and in the current corresponding FIFO queue. Instead of merging, the existing predicted access future can also be replaced with the current queue. The predicted access futures for the multiple stored objects can be maintained centrally on a server or the like, for example as a predictor table with a column for each stored object.

Other aspects include corresponding methods, systems, apparatus, and computer program products for these and other innovative aspects.

Note that the above list of features is not all-inclusive and many additional features and advantages are contemplated and fall within the scope of the present disclosure. Moreover, the language used in the present disclosure has been principally selected for readability and instructional purposes, and not to limit the scope of the subject matter disclosed herein.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The present disclosure describes technology, which may include methods, systems, apparatuses, computer program products, and other implementations, for predicting future access requests in an object storage context, by inverting historic object access requests. In the following description, for purposes of explanation, numerous specific details are set forth to provide a thorough understanding of the various aspects of different example embodiments. Note that any particular example embodiment may in various cases be practiced without all of the specific details and/or with variations, permutations, and combinations of the various features and elements described herein.

Access time in storage systems is key for good performance. Multi-tiered storage systems have larger amounts of slower, less expensive storage media (e.g., magnetic media such as hard disk storage), and smaller amounts of faster, more expensive storage media (e.g., solid state media such as flash storage). It is desirable to use the limited amount of available faster storage media to store objects which are most likely to be frequently and/or imminently accessed. The historic inversion pre-fetch manager 101 tracks the historic access of stored objects, and inverts the history to identify those objects that are most likely to be requested in the near future with a high probability. The identified objects can then be proactively pre-fetched from high-latency storage (e.g., mechanical hard disk) to low latency storage (e.g., flash memory). This reduces access time significantly when the actual request for a pre-fetched object occurs. As described in detail below, the historic inversion pre-fetch manager 101 statistically predicts which objects will be accessed in the near future, with minimal overall impact. This prediction is implemented by inverting the access history of objects to determine their predicted access future. Spare CPU-time can be utilized in a low-priority process that can learn and accumulate statistical evidence concerning these objects, with minimal overhead on the computation resources. Furthermore, the techniques described herein for "inverting the history to a future" are independent of, and not limited by the number of access nodes (e.g., load balancers and the like) utilized to process access requests.

Figure 1:
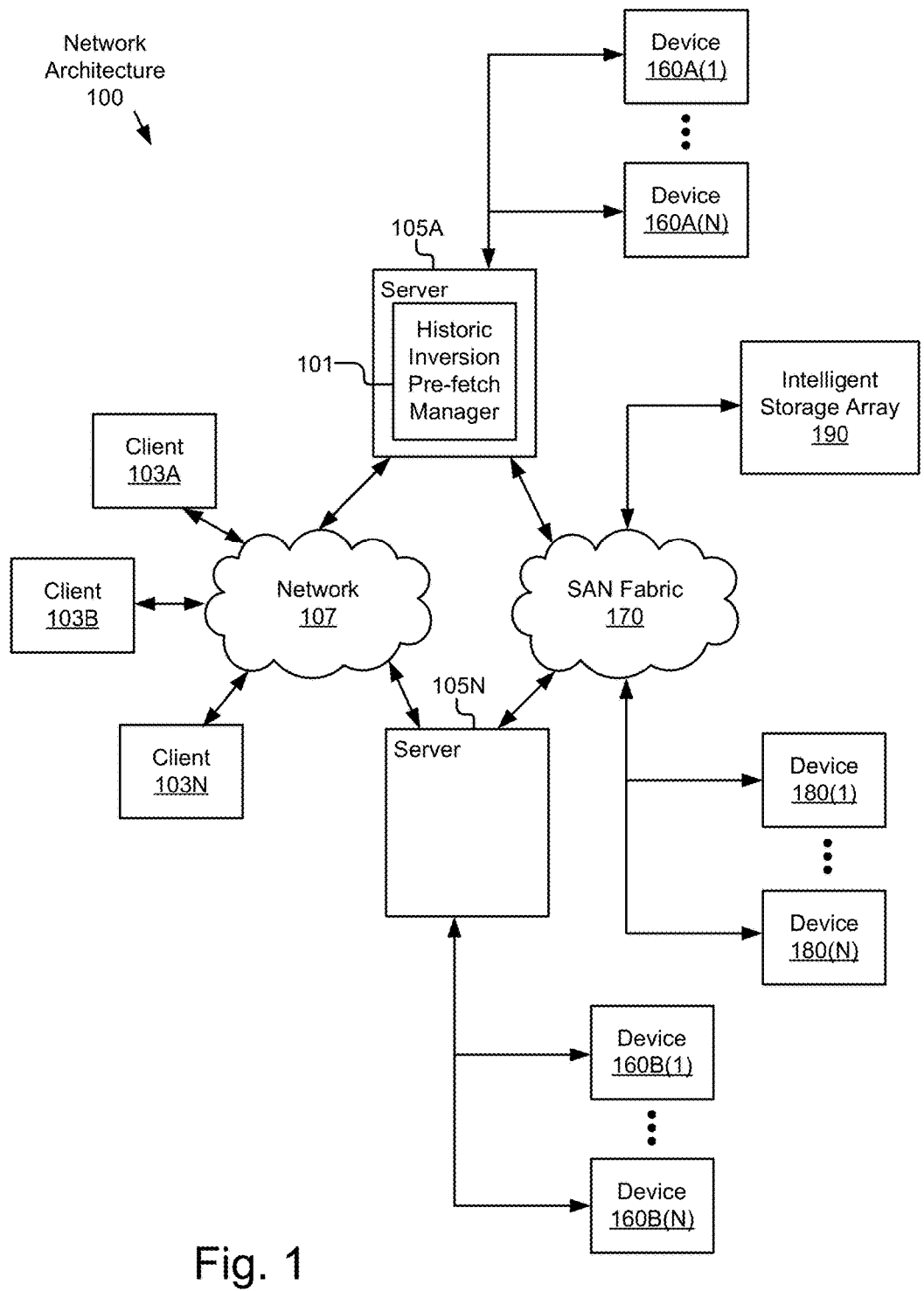
FIG. 1 is a block diagram of an exemplary network architecture in which a historic inversion pre-fetch manager can be implemented, according to some embodiments.
Figure 3:
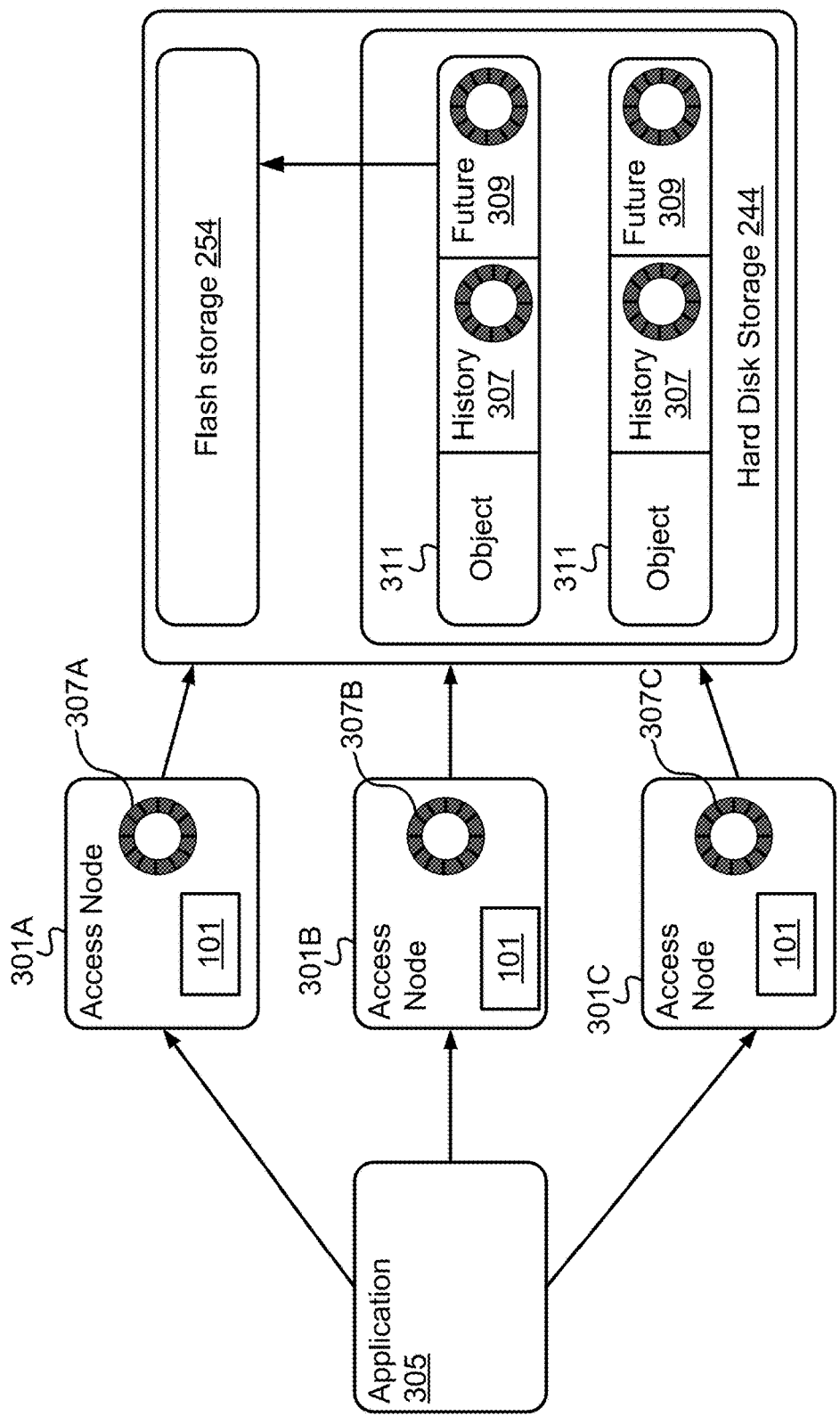
FIG. 3 is a block diagram of the operation of a historic inversion pre-fetch manager, according to one embodiment.
Figure 4:
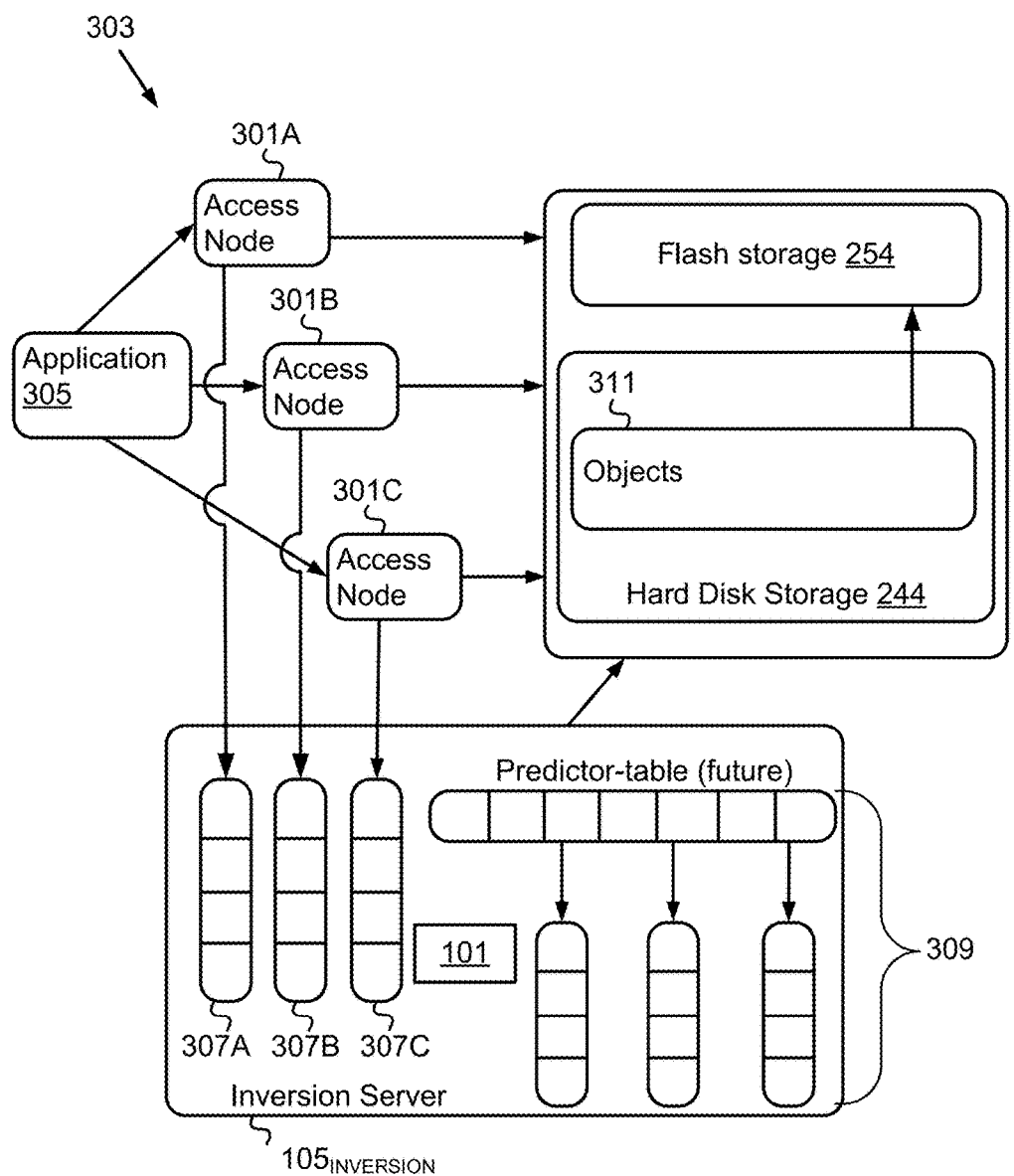
FIG. 4 is a block diagram of the operation of a historic inversion pre-fetch manager, according to a different embodiment.

FIG. 1 is a block diagram illustrating an exemplary network architecture 100 in which a historic inversion pre-fetch manager 101 can be implemented. In the illustrated network architecture 100, client systems 103A, 103B and 103N, as well as servers 105A and 105N, are communicatively coupled to a network 107. A historic inversion pre-fetch manager 101 is illustrated as residing on server 105A, but in other embodiments the historic inversion pre-fetch manager 101 can reside on more, fewer or different computers 210 as desired. In FIG. 1, server 105A is further depicted as having storage devices 160A(1)-(N) directly attached, and server 105N is depicted with storage devices 160B(1)-(N) directly attached. As an example of another possible storage architecture according to some embodiments, servers 105A and 105N are depicted as also being connected to a SAN fabric 170 which supports access to storage devices 180(1)-(N) by servers 105A and 105N, and so by client systems 103A-N via network 107. Intelligent storage array 190 is also shown as an example of a specific storage device accessible via SAN fabric 170. It is to be understood that the embodiment described in conjunction with FIG. 3-4 is directed to object storage. SAN 170 is shown in FIG. 1 only as an example of another possible architecture to which the historic inversion pre-fetch manager 101 might be applied in another embodiment. In yet other embodiments, shared storage can be implemented using FC and iSCSI (not illustrated) instead of a SAN fabric 170. It is to be understood that storage devices 160A(1)-(N), 160B(1)-(N) and 180(1)-(N), as well as SAN fabric 170 and intelligent storage array 190 are just examples of possible architectures according to some embodiments. Other storage architectures and configurations can be used in other embodiments. As described in more detail below, storage components can comprise larger amounts of slower storage (e.g., electromechanical storage such as hard disks) in combination with smaller amounts of faster storage (e.g., solid state storage such as flash memory). Solid state storage has significantly faster access times than the electromechanical storage, and thus can be used as a high speed cache.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190. It is to be understood that in practice, the number of servers 105 and storage devices 160 may be orders of magnitude greater than what is depicted in FIG. 1. For example, the historic inversion pre-fetch manager 101 can target a large storage rack consisting of a dozen or more servers 105, hundreds of hard disks 224 and a fast network 107.

In one embodiment, the network 107 is in the form of the Internet. Other networks 107 or network-based environments can be used in other embodiments.

Figure 2:
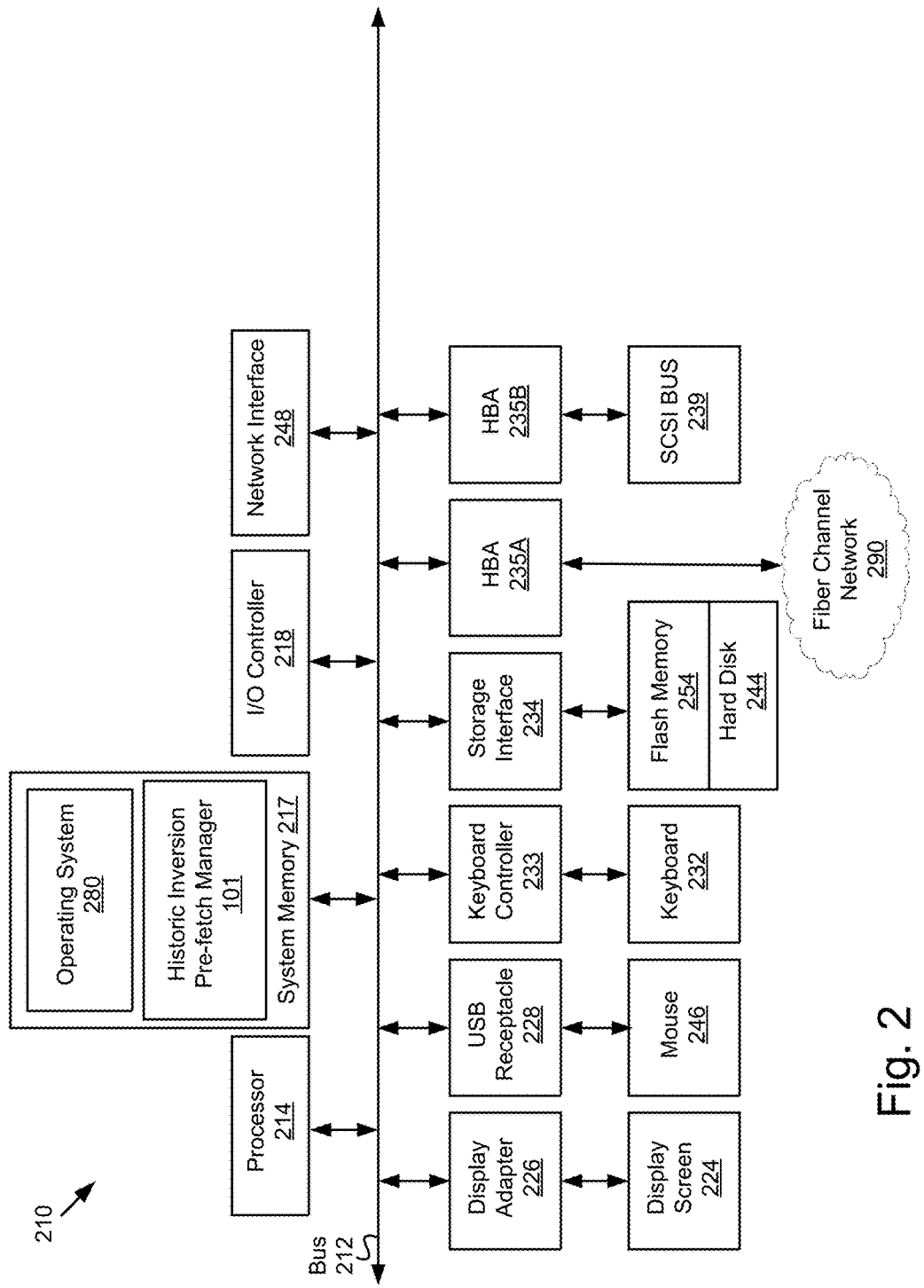
FIG. 2 shows an example computing device on which a historic inversion pre-fetch manager resides, according to some embodiments.

FIG. 2 is a block diagram of a computing device 210 suitable for implementing a historic inversion pre-fetch manager 101. As illustrated, one component of the computing device 210 is a bus 212. The bus 212 communicatively couples other components of the computing device 210, such as at least one processor 214, system memory 217 (e.g., random access memory (RAM), read-only memory (ROM), flash memory 254), an input/output (I/O) controller 218, a display adapter 226 communicatively coupled to a video output device such as a display screen 224, one or more interfaces such as Universal Serial Bus (USB) receptacles 228, a keyboard controller 233 communicatively coupled to a keyboard 232, a storage interface 234 communicatively coupled to one or more hard disk(s) 244 and/or solid state or other form(s) of storage media, a host bus adapter (HBA) interface card 235A configured to connect with a Fibre Channel (FC) network 290, an HBA interface card 235B configured to connect to a SCSI bus 239, and one or more wired and/or wireless network interface(s) 248 coupled, e.g., directly to bus 212.

Other components (not illustrated) may be connected in a similar manner. Conversely, all of the components illustrated in FIG. 2 need not be present. For example in embodiments in which the historic inversion pre-fetch manager 101 is implemented on a access node 301 or other type of programmable network appliance, components such as keyboard 232 and display screen 224 might not be present thereon, whereas in embodiments in which the historic inversion pre-fetch manager 101 is implemented on a server computer 105, the server would typically include these components. In different embodiments, the various components of the computing device 210 can be interconnected in different ways from that shown in FIG. 2.

The bus 212 allows data communication between the processor 214 and system memory 217, which, as noted above may include ROM and/or flash memory 254 as well as RAM. The RAM is typically the main memory into which the operating system 280 and application programs are loaded. The ROM and/or flash memory 254 can contain, among other code, the Basic Input-Output system (BIOS) which controls certain basic hardware operations. Application programs can be stored on a local computer readable medium (e.g., hard disk 244, optical disk 242, flash memory 254) and loaded into system memory 217 and executed by the processor 214. Application programs can also be loaded into system memory 217 from a remote location (i.e., a remotely located computing device 210), for example via the network interface 248 or modem 247. In FIG. 2, the historic inversion pre-fetch manager 101 is illustrated as residing in system memory 217. The workings of the historic inversion pre-fetch manager 101 are explained in greater detail below in conjunction with FIG. 3. Also illustrated as residing in the system memory 217 is the operating system 280 of the computing device 210.

The storage interface 234 is coupled to one or more hard disks 244 and/or other storage media such as flash memory 254. The hard disk(s) 244 may be a part of computing device 210, or may be physically separate and accessed through other interface systems.

The network interface 248 and/or modem 247 can be directly or indirectly communicatively coupled to a network 107 such as the Internet 109.

FIG. 3 illustrates one embodiment in which a historic inversion pre-fetch manager 101 runs on each one of multiple access nodes 301A-N interfacing with a storage device 160. FIG. 4 illustrates another embodiment, in which a historic inversion pre-fetch manager 101 runs on a server 105. It is to be understood that these are just example embodiments. The functionalities of the historic inversion pre-fetch manager 101 can be implemented on other computing devices 210 in other embodiments, or can be distributed between multiple computing devices 210, including within a cloud-based computing environment in which the functionality of the historic inversion pre-fetch manager 101 is provided as a service over a network 107. It is to be understood that although the historic inversion pre-fetch manager 101 is illustrated in FIGS. 3 and 4 as a standalone entity, the illustrated historic inversion pre-fetch manager 101 represents a collection of functionalities, which can be instantiated as a single or multiple modules on one or more computing devices 210 as desired. In FIGS. 3 and 4, the historic inversion pre-fetch manager 101 is illustrated as being a separate component from a centralized storage manager 303. In some embodiments, the historic inversion pre-fetch manager 101 is provided in conjunction with and/or as part of a centralized cloud based and/or organization-level storage manager 303.

It is to be understood the historic inversion pre-fetch manager 101 can be instantiated as one or more modules (for example as object code or executable images) within the system memory 217 (e.g., RAM, ROM, flash memory 254) of any computing device 210, such that when the processor 214 of the computing device 210 processes a module, the computing device 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the historic inversion pre-fetch manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Turning now to FIG. 3, an exemplary storage architecture consists of three or more access nodes 301 above a storage device 160 comprising hard disk storage 244 and flash storage 254. The access nodes 301 are computing components utilized to process access requests (e.g., read/GET, write/PUT) targeting stored objects 311 (e.g., files). An access node 301 can be in the form of physical (hardware) or virtual (software) based load balancer or other entry point that provides an interface between requesting applications 305 and stored objects 311 (access nodes 301 are sometimes referred to as "scaler" nodes or "scalers"). FIG. 3 illustrates three access nodes 309 as an example, but more or fewer can be deployed in different embodiments as desired. For clarity of illustration, the storage device 160 in FIG. 3 is illustrated as a single entity, but multiple physical and/or virtual storage devices 160 can be utilized in this capacity. FIG. 3 also illustrates flash storage 254 and hard disk storage 244, but other types of fast and/or slow storage media can be used in different embodiments. A requesting application 305 can direct any given access request to any of the access node 301 to connect to the storage device 160. In other words, in the illustrated embodiment there is no single point of access to the storage 160, due to the multiple access nodes 301. FIG. 3 illustrates a single requesting application 305 for clarity of explanation, but it is to be understood that multiple requesting applications 305 can interface with the access nodes 301.

In the embodiment illustrated in FIG. 3, the historic inversion pre-fetch manager 101 maintains an independent object access history 307 on or in association with each access node 301, independent of the history 307 that is kept on the other access nodes 301. The object access history 307 of a given access node 301 keeps a record of the last N objects 311 that were accessed through that access node 301 (e.g., with either GET or PUT). Different data structures can be used to implement the object access history 307 in different embodiments. In one embodiment a circular buffer of N buckets is used, to keep a record of the last N objects 311 accessed through the given node 301. Whenever a specific object 311 is accessed via a given access node 301, the corresponding history 307 is updated to record that the specific object 311 was the one most recently accessed by the given node 301. Objects 311 can be identified in the history 307 by object ID or some other unique identifier. Thus, the history 307 on each access node 301 becomes populated with identifiers of the N objects 311 most recently accessed via that node 301. Once the history 307 is full and a new object 311 is accessed, the least recent entry (the first in) can be overwritten. Different values for N can be used in different embodiments (e.g., 64, 128, 256, etc.). The buffer size is a variable parameter which can be adjusted up and down to tune the accuracy/performance trade-off as desired. In other words, the value to use for N is a variable design choice, and different specific given numbers can be used in different embodiments and under different circumstances as desired.

When an object 311 is initially written to storage 160, the historic inversion pre-fetch manager 101 stores a copy of the current object access history 307 of the corresponding access node 301 in association with the object 311 in the form of metadata. This additional metadata is relatively small, because it is only N (e.g., 128) times the object identifier size (e.g., a 64-bit number). Note that the history 307 that gets stored with a given object 311 is the history 307 of the access node 301 which processed the corresponding access request, which is separate from the histories 307 on the other access nodes 301. In the embodiment of FIG. 3, the historic inversion pre-fetch manager 101 makes no further assumptions about that, and assumes that the choice of the access node 301 that processes the request is entirely random. Different objects 311 will thus be stored with different histories 307, depending on the processing access node 301. Once a given history 307 is stored in association with a given object 311 as metadata, this metadata is not updated until and unless the stored object 311 is itself accessed again. At such time, the object access history 307 associated with the accessed object 311 is updated. This can take the form of merging or replacing the current metadata with a copy of the object access history 307 of the currently processing access node 301. The access node 301 processing the current request might be a different one from the access node 301 that processed the first request to store the object 311, and as such the historic inversion pre-fetch manager 101 can merge the previous history 307 that was attached to the object 311 with the current history 307 from the processing access node 301. In one embodiment, the previous access history 307 is replaced by the current history 307 outright. In another embodiment, the N most recently accessed objects 311 from the combination of the two histories 307 are stored in the current history 307. Different merging algorithms and techniques can be used in different embodiments as desired.

The historic inversion pre-fetch manager 101 inverts the histories 307 stored in association with the objects 311 to predict future object accesses 309. In some embodiments, this inversion is performed by a low-priority process which works in idle time and thus incurs no direct additional CPU cost. This process can traverse the contents of the storage device 160, and inspect the history 307 of every object 311 it encounters. Note that where the history 307 of a given object x contains a reference to a different object y, this means that shortly before an access request for object x was made, a request for object y was made. Thus, to establish the predicted access future 309 for objects associated with object y, the historic inversion pre-fetch manager 101 adds a circular buffer (or other data structure) to the metadata of object y and puts a reference to x in it. After some time, when the historic inversion pre-fetch manager 101 has encountered a reference to y in the history 307 of objects $x_1$, $x_2$, $x_3$, . . . $x_n$, the predicted access future 309 of y will become populated with references to objects $x_1$, $x_2$, $x_3$, . . . $x_n$ in no particular order. Now, this predicted access future 309 can be used to predict which objects 311 will be accessed after y. Any time a request for object y is processed by any of the access nodes 301, the historic inversion pre-fetch manager 101 inspects the predicted access future 309 of y, and determines that objects $x_1$, $x_2$, $x_3$, . . . $x_n$ are listed therein. In effect, the historic inversion pre-fetch manager 101 has learned from the past object access history that there is a statistically significant chance that objects $x_1$, $x_2$, $x_3$, . . . $x_n$ will be accessed in the near future after y has been accessed. Thus, at least some of these objects $x_1$, $x_2$, $x_3$, . . . $x_n$ can be pre-fetched and put in fast (e.g., flash) storage 254 to reduce latency. In other words, because it has been determined that it is statistically likely that objects $x_1$, $x_2$, $x_3$, . . . $x_n$ will be accessed shortly (e.g., within a given time period) after object y, in response to object y being accessed, at least a subset of objects $x_1$, $x_2$, $x_3$, . . . $x_n$ are pre-fetched to fast storage 254, to reduce access latency when they are requested.

Note that based on the amount of fast storage available, it is typically practicable to pre-fetch only so many objects 311. Therefore, the historic inversion pre-fetch manager 101 may select a subset of $x_i$'s out of the set of objects $x_1$, $x_2$, $x_3$, . . . $x_n$ (the objects 311 listed in the predicted access future 309 for accessed object y). Only those $x_i$'s in the subset are pre-fetched, instead of all of the objects $x_1$, $x_2$, $x_3$, . . . $x_n$ in the corresponding predicted access future 309. The specific number of objects 311 to pre-fetch is a variable design parameter (e.g., 0, 1, 2, 3, etc.) which can be adjusted up and down depending upon, for example, the amount of fast storage currently available. Although the predicted access future 309 for a given object 311 may be large and contain many references to other objects 311, the historic inversion pre-fetch manager 101 can pre-fetch only a relatively small number of these objects 311. The number of objects 311 to pre-fetch can even be 0 under certain circumstances, for example when pre-fetch-storage capacity is low. The predicted access future 309 serves as a type of statistical accumulator which becomes better over time, and thus predictions become more accurate the longer the historic inversion pre-fetch manager 101 runs.

In order to choose which specific objects 311 to pre-fetch out of all those listed in the relevant predicted access future 309, the historic inversion pre-fetch manager 101 can select those that occur most frequently (several objects $x_i$ might appear multiple times in the given predicted access future 309). Thus, the historic inversion pre-fetch manager 101 can calculate how many times each object 311 effectively occurs in the predicted access future 309, and pre-fetch the n objects 311 which occur most frequently where n is the number of objects 311 to pre-fetch, breaking ties randomly. In other embodiments, the historic inversion pre-fetch manager 101 can make the selections using other factors as desired (e.g., weighting objects 311 based on size, storage location, type(s) of access request(s), or other criteria which, in some embodiments, may be stored in the history 307 with the object IDs).

To recapitulate, in the embodiment of FIG. 3, a separate object access history 307 is maintained on each access node 301, and a copy of that history 307 is included or merged into the metadata of each object 311 accessed to/from storage 244 through that node 301. The historic inversion pre-fetch manager 101, typically via a low-priority process, inverts the histories 307 stored in conjunction with the objects 311 to predicted access futures 309, through the addition of a reference to object x in the predicted access future 309 of object y whenever it encounters a reference to y in the history 307 of x. Finally, if a request for object y is made, some objects $x_i$ which are referenced in the predicted access future 309 of object y are pre-fetched because of the statistical evidence that the request for y is causally related to a future request for the $x_i$'s.

Turning now to FIG. 4, another embodiment is described in which the inversion functionality is performed on a server 105 (referred to herein as the inversion server $105_{INVERSION}$). Note that this approach can be added to an storage system 303 with minimal overhead in CPU, RAM or diskspace.

Like FIG. 3, in FIG. 4 a requesting application 305 is illustrated interfacing with object storage (illustrated as the storage device 160) via three access nodes 301. As explained in conjunction with FIG. 3, although a single requesting application 305 and three access nodes 301 are illustrated for clarity, it is possible for multiple applications 305 to access stored objects 311 on various combinations of storage devices 160 comprising different architectures, via more or fewer access nodes 301 as desired. Regardless, in the embodiment of FIG. 4, rather than tracking object access history 307 separately in each access node 301 (e.g., via a circular buffer) as described in conjunction with FIG. 3, the object access history 307 is tracked on the inversion server $105_{INVERSION}$. For each object access request (e.g., GET or PUT) processed by any given access node 301, the processing access node 301 transmits the unique ID of the target object 311 to the historic inversion pre-fetch manager 101 on the inversion server $105_{INVERSION}$. The historic inversion pre-fetch manager 101 keeps track of the object access history 307 per access node, and inverts the histories 307 to a predicted access future 309 per object, continuously and in real-time.

The historic inversion pre-fetch manager 101 maintains the history 307 in the form of a separate FIFO-queue (or other data structure, e.g., a cyclic buffer) for each access node 301. Every time a request for a given object x is passed to a given access node (e.g., 301A), the access node 301A processes the request, but also passes the unique ID for object x to the historic inversion pre-fetch manager 101. The historic inversion pre-fetch manager 101 adds this object ID to the end of the FIFO queue corresponding to that specific access node 301A, dropping the front (the oldest) ID in that queue if it is full (which it will be once the access node 301A has processed N requests, where N is the size of the queue). Thus, when the requesting application 305 requests a certain object x from storage through the first access node 301A, the access node 301A processes the request for the application 305. In parallel, the access node 301A passes the object ID of x to the historic inversion pre-fetch manager 101 on the inversion server $105_{INVERSION}$. The historic inversion pre-fetch manager 101 logs the access request for object x in the history 307 corresponding to access node 301A, by adding the ID for object x to the end of the FIFO queue corresponding to access node 301A.

Every time a given object x is requested through a given access node (e.g., 301A), the ID for object x is added to the end of the corresponding queue, and the object y at the front of that queue is discarded (i.e., when the ID for object x is added to the end of the queue, each object ID in the queue is moved up one bucket towards the front, and the object ID previously at the front (the ID for object y), is displaced from the queue). Thus, the queue functions as the instantiation of the object access history 307 for the corresponding access node 301A. Object y which is displaced from the queue by the addition of object x was requested exactly N requests before object x, where N is the queue size. Thus, at the time that the ID of object y is displaced from the queue, the queue contains the N predicted future requests coming after object y, the last of which is x. The historic inversion pre-fetch manager 101 leverages this information to invert the histories 307 to determine the predicted future 309 of object access requests.

More specifically, in the embodiment of FIG. 4 the historic inversion pre-fetch manager 101 builds the predicted access future 309 in the form of a predictor table (or other suitable data structure), which tracks, for every object 311 in the storage 160, a set of IDs of objects 311 that are predicted to be requested next, similar to the embodiment of FIG. 3 in which a reference to object x is stored in the predicted access future 309 of object y. Using the predictor table as the predicted access future 309 as illustrated in FIG. 4, for every object y in the storage 160, an entry containing the unique ID of that object y is present the predictor table, and can be accessed to determine the predicted access future 309 of that object y. The predicted access future 309 of y is updated every time the ID of y is displaced from a FIFO queue (history 307) for any given access node 301, as described above. At that moment, the FIFO queue in question contains recent information about the N objects 311 requested after y, where N is the size of the queue. That information is merged with the already stored information of object y in the predictor table. This merging can be performed by first decaying the old counts in the predicted access future 309 of y, then adding new information from the recent FIFO-queue. As described above in conjunction with FIG. 3, in different embodiments different merging algorithms can be used in this context, or the old predicted access future 309 can be replaced by the new one outright.

To illustrate, suppose the historic inversion pre-fetch manager 101 has been running for some time. In this scenario, the predictor table will be filled with relevant and causal relations between object y and its predicted access future 309 objects $x_1, x_2, x_3, \ldots x_n$. If a given access node 301 receives a new request for object y, the access node 301 processes the request, and also sends the object ID of y to the historic inversion pre-fetch manager 101. The historic inversion pre-fetch manager 101 looks up the predicted access future 309 of y in the predictor table, and determines the n objects $x_1, x_2, x_3, \ldots x_n$ predicted to be accessed after object y. A subset of these $x_i$'s are pre-fetched and put in the low-latency (e.g., flash) storage 254. As noted above in the discussion of FIG. 3, the number of $x_i$'s to pre-fetch is a variable design parameter. In any case, the n pre-fetched objects can be the n objects with highest count in the predicted access future 309 of y, where n is the number of objects 311 to pre-fetch. This is so because of all the objects 311 in the predicted access future 309 of y (i.e., $x_1$, $x_2$, $x_3, \ldots x_n$), those with the highest counts have the highest probability to be requested imminently (e.g., in the next few requests, within a given time period), according to the statistical evidence gathered in the predictor-table. By pre-fetching from slower storage 244 to faster storage 254 those objects that are most likely to be accessed next after every access request, access latency is reduced significantly.

Thus, regardless of the specific embodiment utilized, the historic inversion pre-fetch manager 101 tracks object access history 307, and inverts this information to a predicted access future 309. This enables discovery of functional and causal relations between objects 311, by explicitly keeping track of both the history 307 and the predicted future 309 of the access of objects 311 in the storage 106. This works across multiple access nodes 301. Keeping a different history 307 per access node 301 does not decrease performance, and indeed the results converge to the same predicted access future 309 as the system runs over time, as if there were only a single access node 301. The historic inversion pre-fetch manager 101 can be implemented in a space- and time-bounded environment as described herein, using only spare CPU-cycles.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in enough detail to enable the disclosed teachings to be practiced. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the below claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. The illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others to best utilize the various example embodiments with various modifications as are suited to the particular use contemplated.

Note that, although the terms "first," "second," and so forth may be used herein to describe various elements, these elements are not to be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. Also note that the term "and/or" as used herein refers to and encompasses any and/or all possible combinations of one or more of the associated listed items. Furthermore, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As will be understood by those skilled in the art, the invention may be embodied in other specific forms without departing from the spirit or essential characteristics thereof. Likewise, the particular naming and division of the portions, modules, servers, managers, components, functions, procedures, actions, layers, features, attributes, methodologies, data structures and other aspects are not mandatory or significant, and the mechanisms that implement the invention or its features may have different names, divisions and/or formats. The foregoing description, for the purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method comprising:
processing, by a plurality of access nodes, requests to access specific ones of a plurality of stored objects;
for each separate specific access node of the plurality, maintaining in real-time an access history identifying a given number of stored objects most recently accessed through the specific access node;
for each separate specific stored object of the plurality, maintaining in real-time an associated predicted access future comprising a listing of stored objects statistically predicted to be those stored objects of the plurality that are most likely to be accessed within a given temporal proximity after the specific stored object is accessed, each predicted access future being determined based on inversion of maintained access histories;
responsive to a received access request for a specific stored object, reading a predicted access future associated with the specific requested stored object;
processing the received access request for the specific requested stored object; and
pre-fetching, from slower storage to faster storage, a specific number of additional stored objects identified in the predicted access future associated with the specific requested stored object.

2. The computer-implemented method of claim 1, further comprising:
maintaining in real-time, by each separate specific access node of the plurality, a locally-stored access history identifying the given number of stored objects most recently accessed through the specific access node; and
for each specific stored object accessed through a given access node, storing the given access node's locally-stored access history identifying the given number of stored objects most recently accessed through the given access node, in association with the specific accessed stored object as metadata.

3. The computer-implemented method of claim 2, wherein storing the given access node's locally-stored access history identifying the given number of stored objects most recently accessed through the given access node, in association with the stored object as metadata further comprises:
when initially storing a new object by the given access node, storing the given access node's current locally-stored access history identifying the given number of stored objects most recently accessed through the given access node, in association with the new stored object as metadata.

4. The computer-implemented method of claim 2, wherein storing the given access node's locally-stored access history identifying the given number of stored objects most recently accessed through the given access node, in association with the stored object as metadata further comprises:
when accessing an existing stored object by the given access node, replacing an existing access history stored in association with the existing stored object as metadata with the given access node's current locally-stored access history identifying the given number of stored objects most recently accessed through the given access node.

5. The computer-implemented method of claim 2, wherein storing the given access node's locally-stored access history identifying the given number of stored objects most recently accessed through the given access node, in association with the stored object as metadata further comprises:
when accessing an existing stored object by the given access node, merging an existing access history stored in association with the existing stored object as metadata with the given access node's current locally-stored access history identifying the given number of stored objects most recently accessed through the given access node.

6. The computer-implemented method of claim 5, wherein merging the existing access history stored in association with the existing stored object with the given access node's current locally-stored access history further comprises:
merging local access histories of at least two access nodes.

7. The computer-implemented method of claim 2, wherein an access history identifying the given number of stored objects most recently accessed through a given access node further comprises:
a circular buffer holding identifiers of the given number of stored objects most recently accessed through the given access node.

8. The computer-implemented method of claim 2, wherein maintaining in real-time an associated predicted access future for each separate specific stored object of the plurality further comprises:
periodically reading access histories stored in association with separate specific stored objects; and
for each separate specific stored object identified in an access history associated with a given stored object, adding the given stored object to a predicted access future associated with the specific identified object.

9. The computer-implemented method of claim 2, wherein maintaining in real-time an associated predicted access future for each separate specific stored object of the plurality further comprises:
storing an associated predicted access future as metadata of each separate specific stored object of the plurality.

10. The computer-implemented method of claim 2, wherein a predicted access future associated with a given stored object further comprises:
a circular buffer holding identifiers of stored objects.

11. The computer-implemented method of claim 2, wherein a predicted access future associated with a given stored object further comprises:
a data structure holding identifiers of a given number of stored objects statistically predicted to be those stored objects of the plurality that are most likely to be accessed within a given temporal proximity after the given stored object is accessed.

12. The computer-implemented method of claim 1, further comprising:
maintaining in real-time a separate access history corresponding to each specific access node of the plurality;
wherein each separate access history comprises a first-in first-out (FIFO) queue containing identifiers of the given number of stored objects most recently accessed through the corresponding specific access node.

13. The computer-implemented method of claim 12, further comprising:

responsive to a given access node processing an access request for a specific requested stored object, updating the access history corresponding to the given access node by:
  adding an identifier of the specific requested stored object to the back of the corresponding FIFO queue; and
  discarding an identifier at the front of the corresponding FIFO queue; and
responsive to the discarding the identifier at the front of the corresponding FIFO queue, adding the stored objects identified in the corresponding FIFO queue to a predicted access future associated with an object identified by the discarded identifier.

14. The computer-implemented method of claim 13, wherein adding the stored objects identified in the FIFO queue to a predicted access future associated with an object identified by the discarded identifier further comprises:
  merging an existing predicted access future associated with an object identified by the discarded identifier with the current corresponding FIFO queue.

15. The computer-implemented method of claim 14, wherein merging an existing predicted access future associated with an object identified by the discarded identifier with the current corresponding FIFO queue further comprises:
  merging an existing predicted access future inverted from an access history corresponding to at least a first access node with the current FIFO queue corresponding to a second access node.

16. The computer-implemented method of claim 14, wherein merging an existing predicted access future associated with an object identified by the discarded identifier with the current corresponding FIFO queue further comprises:
  accumulating total instances of specific stored objects in both the existing predicted access future associated with an object identified by the discarded identifier and in the current corresponding FIFO queue.

17. The computer-implemented method of claim 13, wherein adding the stored objects identified in the FIFO queue to a predicted access future associated with an object identified by the discarded identifier further comprises:
  replacing an existing predicted access future associated with an object identified by the discarded identifier with the current corresponding FIFO queue.

18. The computer-implemented method of claim 1, wherein pre-fetching from slower storage to faster storage at least one additional stored object identified in the predicted access future associated with the specific requested stored object comprises:
  pre-fetching, from electro-mechanical storage to solid state storage, a pre-determined number of additional stored objects identified in the predicted access future associated with the specific requested stored object.

19. A computer system comprising:
a processor;
system memory;
an electromechanical storage;
a solid state storage;
a request processing module residing in the system memory, configured to process requests to access specific ones of a plurality of stored objects, by a plurality of access nodes;
an access history maintaining module residing in the system memory, configured to, for each separate specific access node of the plurality, maintain in real-time an access history identifying a given number of stored objects most recently accessed through the specific access node;
a predicted access future maintaining module residing in the system memory, configured to, for each separate specific stored object of the plurality, maintain in real-time an associated predicted access future comprising a listing of stored objects statistically predicted to be those stored objects of the plurality that are most likely to be accessed within a given temporal proximity after the specific stored object is accessed, each predicted access future being determined based on inversion of maintained access histories;
a predicted access future reading module residing in the system memory, configured to, responsive to a received access request for a specific stored object, read a predicted access future associated with the specific requested stored object; and
a pre-fetching module residing in the system memory, configured to pre-fetch from the electromechanical storage to the solid state storage at least one additional stored object identified in the predicted access future associated with the specific requested stored object.

20. A computer system comprising:
means for processing requests to access specific ones of a plurality of stored objects, by a plurality of access nodes;
means for maintaining in real-time, for each separate specific access node of the plurality, an access history identifying a given number of stored objects most recently accessed through the specific access node;
means for maintaining in real-time, for each separate specific stored object of the plurality, an associated predicted access future comprising a listing of stored objects statistically predicted to be those stored objects of the plurality that are most likely to be accessed within a given temporal proximity after the specific stored object is accessed, each predicted access future being determined based on inversion of maintained access histories;
means for reading, responsive to a received access request for a specific stored object, a predicted access future associated with the specific requested stored object; and
means for pre-fetching from slower storage to faster storage a specific number of additional stored objects identified in the predicted access future associated with the specific requested stored object.

\* \* \* \* \*